UNITED STATES PATENT OFFICE.

LAURENCE T. SHERWOOD, OF CONNELLSVILLE, PENNSYLVANIA.

MANUFACTURE OF GLASS.

1,277,493.

Specification of Letters Patent.

Patented Sept. 3, 1918.

No Drawing.

Application filed November 18, 1916. Serial No. 132,111.

*To all whom it may concern:*

Be it known that I, LAURENCE T. SHERWOOD, a citizen of the United States, residing at Connellsville, in the county of Fayette and State of Pennsylvania, have invented certain new and useful Improvements in the Manufacture of Glass, of which the following is a specification.

Niter cake, sodium hydrogen sulfate, is a by-product in the manufacture of nitric acid and its use in the arts is extremely limited so that it is plentiful and is, in effect, a waste product.

The principal object of the present invention is to provide for industrially using niter cake thereby converting this by-product, heretofore largely wasted, into a valuable raw material.

To this and other ends hereinafter set forth, the invention, stated in general terms, comprises the improvement in the manufacture of glass which consists in making glass with niter cake as a fluxing or alkali component thereof, and my invention is based upon the discovery that this can be done by the conjoint use of carbon or carbonaceous matter and niter cake in the batch or mixture from which the glass is made.

The production of glass by the use of niter cake does not by any means simply involve the substitution of niter cake for fluxing components such as soda ash, sodium carbonate, or salt cake, sodium sulfate, for it is impossible to commercially make glass with niter cake unless an appropriate amount of carbon is added to the mixture or batch from which the glass is made. Good results have been obtained by the use of carbon or carbonaceous matter in the form of pulverized bituminous coal. I have produced successful glass by the use of the following proportions in the batch or mixture: sand 45%; niter cake 43.4%; calcium oxid 6.4%; and pulverized bituminous coal 5.2%, but the invention is not limited to these proportions nor ingredients, since the point is that niter cake can be used in the batch or mix provided an appropriate proportion of carbon is present, which, generally speaking, is twice as much carbon as is used with normal sulfate to produce the same quality of glass in each case. From the proportions above given it appears that the amount of carbon is substantially twice what it would be in the case of the use of normal sulfate. I may say that, if desired, niter cake and carbon can be used in association with other sodium components such as soda ash or salt cake. In accordance with custom any imperfections of color that may occur in the glass can be corrected in ways that are well understood by those skilled in the art.

What I claim is:

1. In the manufacture of glass a batch or mix containing niter cake and carbon amounting at least to 11% of the niter cake.

2. In the manufacture of glass a batch or mix containing niter cake and substantially twice as much carbon as is appropriate for normal sulfate.

LAURENCE T. SHERWOOD.